US008822962B2

(12) United States Patent
Sakai et al.

(10) Patent No.: US 8,822,962 B2
(45) Date of Patent: Sep. 2, 2014

(54) ULTRAVIOLET IRRADIATOR AND ULTRAVIOLET IRRADIATING APPARATUS USING THE SAME

(75) Inventors: Kazuhiro Sakai, Gyoda (JP); Takuya Miyamae, Gyoda (JP); Kenichirou Ono, Gyoda (JP); Takanobu Fujima, Gyoda (JP); Ryuichi Iwazaki, Gyoda (JP)

(73) Assignee: Iwasaki Electric Co., Ltd., Tokyo (JP)

(*) Notice: Subject to any disclaimer, the term of this patent is extended or adjusted under 35 U.S.C. 154(b) by 9 days.

(21) Appl. No.: 13/370,598

(22) Filed: Feb. 10, 2012

(65) Prior Publication Data

US 2012/0235060 A1 Sep. 20, 2012

(30) Foreign Application Priority Data

Mar. 16, 2011 (JP) ................................ 2011-057393

(51) Int. Cl.
*B01J 19/12* (2006.01)
*H01J 61/52* (2006.01)

(52) U.S. Cl.
CPC ..................................... *H01J 61/52* (2013.01)
USPC .................. 250/504 R; 250/492.1; 250/493.1

(58) Field of Classification Search
CPC ........................................................ B01J 19/12
USPC ..................................................... 250/504 R
See application file for complete search history.

(56) References Cited

U.S. PATENT DOCUMENTS

| | | | | |
|---|---|---|---|---|
| 5,433,920 | A * | 7/1995 | Sizer et al. | 422/24 |
| 6,035,548 | A * | 3/2000 | Rae | 34/274 |
| 6,457,846 | B2 * | 10/2002 | Cook et al. | 362/321 |
| 6,730,113 | B2 * | 5/2004 | Eckhardt et al. | 607/94 |
| 2005/0185408 | A1 * | 8/2005 | Jin et al. | 362/303 |

FOREIGN PATENT DOCUMENTS

| | | | | |
|---|---|---|---|---|
| GB | 2336895 | A * | 3/1999 | F21V 7/00 |
| JP | 60-176244 | U | 11/1985 | |
| JP | 6-267509 | A | 9/1994 | |
| JP | 7-68163 | A | 3/1995 | |
| JP | 9-210897 | A | 8/1997 | |
| JP | 10-104151 | A | 4/1998 | |
| JP | 2000-231199 | A | 8/2000 | |

(Continued)

OTHER PUBLICATIONS

Japanese Office Action dated Mar. 11, 2014, issued in corresponding Japanese Patent Application No. 2011-057393, w/ English translation (10 pages).

*Primary Examiner* — Phillip A Johnston
(74) *Attorney, Agent, or Firm* — Westerman, Hattori, Daniels & Adrian, LLP

(57) ABSTRACT

An ultraviolet irradiator including a housing having an ultraviolet irradiation port through which the target is irradiated with the ultraviolet light, an ultraviolet lamp that emits ultraviolet light, a water-cooling jacket in which the ultraviolet lamp is mounted, a reflection plate that reflects light emitted from the ultraviolet lamp, the ultraviolet lamp, the water-cooling jacket and the reflection plate being mounted in the housing, and ultraviolet light emitted directly from the ultraviolet lamp and reflection light reflected from the reflection plate being irradiated to the outside of the housing, a heat withdrawing mechanism that withdraws heat of the reflection plate and discharges the heat to the outside of the housing; and a heat transfer member that transfers ambient heat in the housing to the heat withdrawing mechanism so that the heat withdrawing mechanism withdraws the ambient heat.

9 Claims, 7 Drawing Sheets

(56) References Cited

FOREIGN PATENT DOCUMENTS

| | | | |
|---|---|---|---|
| JP | 2002-191965 | A | 7/2002 |
| JP | 2002-278078 | A | 9/2002 |
| JP | 2002-292825 | A | 10/2002 |
| JP | 2009-072700 | A | 4/2009 |

* cited by examiner (RIGHT SIDE VIEW)

(PLAN VIEW)

| TEST NO. | LAMP POWER (kW) | COOLING WATER TEMPERATURE (°C) | AIR BLOWER | AIR FLOW TO AUXILIARY REFLECTION PLATE | MAIN REFLECTION PLATE | | | | | | | | |
|---|---|---|---|---|---|---|---|---|---|---|---|---|---|
| | | | | | MEASUREMENT POINT (1) | MEASUREMENT POINT (2) | MEASUREMENT POINT (3) | MEASUREMENT POINT (4) | MEASUREMENT POINT (5) | MEASUREMENT POINT (6) | MEASUREMENT POINT (7) | MEASUREMENT POINT (8) | MEASUREMENT POINT (9) |
| TEST 1 | 6.0 | 30 | ON | NO FLOW | 160 | 88 | 162 | 157 | 106 | 188 | 158 | 91 | 169 |
| TEST 2 | 6.0 | 30 | OFF | NO FLOW | 171 | 93 | 183 | 182 | 117 | 199 | 166 | 94 | 188 |
| TEST 3 | 6.0 | 30 | ON | FLOW | 162 | 90 | 162 | 160 | 109 | 189 | 158 | 91 | 168 |

FIG. 6

| TEST NO. | AIR BLOWER | AIR FLOW TO AUXILIARY REFLECTION PLATE | AUXILIARY REFLECTION PLATE | IN-HOUSING AMBIENT TEMPERATURE OF ULTRAVIOLET IRRADIATOR | HOUSING OF ULTRAVIOLET IRRADIATOR | HOUSING OF ULTRAVIOLET IRRADIATING DEVICE |
|---|---|---|---|---|---|---|
| | | | FOUR SURFACE CENTER AVERAGE | | UPPER SURFACE CENTER | FRONT SURFACE CENTER |
| TEST 1 | ON | NO FLOW | 173 | 93 | 78 | 33 |
| TEST 2 | OFF | NO FLOW | 175 | 102 | 78 | 33 |
| TEST 3 | ON | FLOW | 163 | 95 | 81 | 34 |

ULTRAVIOLET IRRADIATOR AND ULTRAVIOLET IRRADIATING APPARATUS USING THE SAME

INCORPORATION BY REFERENCE

The present application claims priority under 35 U.S.C. §119 to Japanese Patent Application No. 2011-057393 filed on Mar. 16, 2011. The content of the application is incorporated herein by reference in its entirety.

BACKGROUND OF THE INVENTION

1. Field of the Invention

The present invention relates to an ultraviolet irradiator for irradiating ultraviolet light (ultraviolet ray), and an ultraviolet irradiating apparatus in which the ultraviolet irradiator is freely incorporated.

2. Description of the Related Art

There is known an ultraviolet irradiating apparatus having a built-in type ultraviolet irradiator which irradiates a sample mounted in a sample chamber with ultraviolet light emitted from the ultraviolet irradiator. This type of ultraviolet irradiating apparatus has been broadly used for weather resistant tests of samples, surface cleaning, reforming, etc. (see JP-A-2002-191965 and JP-A-10-104151, for example).

This type of ultraviolet irradiator has an ultraviolet lamp, a colored glass filter which is disposed so as to surround the ultraviolet lamp and transmits therethrough only a desired ultraviolet region component out of various kinds of light components emitted from the ultraviolet lamp, and a reflection plate for reflecting light emitted from the ultraviolet lamp.

Considering such a situation that the surface temperature of the ultraviolet lamp reaches a high temperature near to 1000° C. when the ultraviolet lamp is turned on, the ultraviolet lamp is mounted in a water-cooling jacket formed of quartz glass to cool the ultraviolet lamp. Furthermore, even the colored glass filter is generally mounted in the water-cooling jacket because it is exposed to light of the ultraviolet lamp and absorbs various light components other than the desired ultraviolet light component (a visible region component and an infrared region component, for example), so that the colored glass filter itself is heated. The colored glass filter is normally fixed in the water-cooling jacket to prevent occurrence of water leakage, and thus the colored glass filter and the water-cooling jacket are unified (see JP-A-10-104151 and JP-A-6-267509, for example).

In these ultraviolet irradiators, when the colored glass filter is deteriorated by ultraviolet light of the ultraviolet lamp and thus the transmissivity of the colored glass filter decreases, the illuminance of the ultraviolet irradiator is lowered due to the decrease of the transmissivity of the colored glass filter. In such a case, however, the colored glass filter must be exchanged by a new one together with the water-cooling jacket because the colored glass filter and the water-cooling jacket are unified. In this case, the water-cooling jacket which has not yet been deteriorated by ultraviolet light must be simultaneously exchanged by a new one, and this is a problem from the view point of running cost.

SUMMARY OF THE INVENTION

The present invention has been implemented in view of the foregoing situation, and has an object to provide an ultraviolet irradiator that can efficiently cool the inside of the ultraviolet irradiator so that the internal temperature (ambient temperature) in the ultraviolet irradiator is surely kept to a proper temperature, and an ultraviolet irradiating apparatus using the ultraviolet irradiator.

Furthermore, the present invention has another object to provide an ultraviolet irradiator that can surely and efficiently irradiate a target with only a desired ultraviolet region component while keeping the internal temperature (ambient temperature) in the ultraviolet irradiator to a proper temperature even when no colored glass filter is provided, and an ultraviolet irradiating apparatus using the ultraviolet irradiator.

In order to attain the above objects, according to an aspect of the present invention, an ultraviolet irradiator for irradiating a target with ultraviolet light comprises: a housing having an ultraviolet irradiation port through which the target is irradiated with the ultraviolet light; an ultraviolet lamp that emits ultraviolet light; a water-cooling jacket in which the ultraviolet lamp is mounted; a reflection plate that reflects light emitted from the ultraviolet lamp, the ultraviolet lamp, the water-cooling jacket and the reflection plate being mounted in the housing, and ultraviolet light emitted directly from the ultraviolet lamp and reflection light reflected from the reflection plate being irradiated to the outside of the housing; a heat withdrawing mechanism that withdraws heat of the reflection plate and discharges the heat to the outside of the housing; and a heat transfer member that transfers ambient heat in the housing to the heat withdrawing mechanism so that the heat withdrawing mechanism withdraws the ambient heat.

The above ultraviolet irradiator may further comprise an air blower that circulates air in the housing to cool the reflection plate, wherein the air blower sucks air that flows along the reflection plate while withdrawing the heat of the reflection plate and blows the air to the heat transfer member.

In the above ultraviolet irradiator, the ultraviolet lamp is configured in a tubular shape, the reflection plate and the heat transfer member are configured to extend along the ultraviolet lamp, and the air blower blows the air to the heat transfer member from a direction perpendicular to an extension direction of the heat transfer member.

The above ultraviolet irradiator may further comprise an auxiliary reflection plate that is disposed between the ultraviolet irradiation port and the ultraviolet lamp to adjust an illuminance distribution, wherein air circulating in the housing flows along the auxiliary reflection plate while cooling the auxiliary reflection plate, and is sucked by the air blower.

The above ultraviolet irradiator may further comprise an ultraviolet transmission filter that is disposed between the ultraviolet irradiation port of the housing and the ultraviolet lamp and allows passage of only light of a predetermined ultraviolet region component out of the ultraviolet light emitted from the ultraviolet lamp and the reflection light reflected from the reflection plate, wherein the reflection plate absorbs light other than the light of the predetermined ultraviolet region component.

According to another aspect of the present invention, an ultraviolet irradiating apparatus comprises: a sample chamber in which a sample is mounted; and an ultraviolet irradiator that is freely incorporated in the ultraviolet irradiating apparatus to irradiate the target with ultraviolet light, wherein the ultraviolet irradiator comprises: a housing having an ultraviolet irradiation port through which the target is irradiated with the ultraviolet light; an ultraviolet lamp that emits ultraviolet light; a water-cooling jacket in which the ultraviolet lamp is mounted; a reflection plate that reflects light emitted from the ultraviolet lamp, the ultraviolet lamp, the water-cooling jacket and the reflection plate being mounted in the housing, and ultraviolet light emitted directly from the ultraviolet lamp and reflection light reflected from the reflection plate being irradiated to the outside of the housing; a heat withdrawing mechanism that withdraws heat of the reflection plate and discharges the heat to the outside of the housing; and a heat transfer member that transfers ambient heat in the housing to the heat withdrawing mechanism so that the heat withdrawing mechanism withdraws the ambient heat.

The above ultraviolet irradiating apparatus may further comprise an apparatus housing in which the sample chamber and the ultraviolet irradiator are mounted, wherein the housing has an opening and a door for opening and closing the opening, and the ultraviolet lamp is freely insertable and dismountable into and from the water-cooling jacket through the opening without dismounting the ultraviolet irradiator from the apparatus housing.

According to the present invention, the heat withdrawing mechanism for withdrawing the heat of the reflection plate and discharging the heat to the outside of the housing is provided. Therefore, the reflection plate can be prevented from being thermally damaged and thermally deformed. Furthermore, the heat transfer member for transferring the ambient heat in the housing to the heat withdrawing mechanism and withdraw the ambient heat, and thus the temperature increase in the housing can be moderated and the temperature in the housing can be kept to a proper temperature.

BRIEF DESCRIPTION OF THE DRAWINGS

FIG. 6 is a table showing measurement results of the temperature of an auxiliary reflection plate, the ambient temperature of the housing of the ultraviolet irradiator, the temperature of the housing and the temperature of the housing of an ultraviolet irradiating apparatus in each test of FIG. 5.

DETAILED DESCRIPTION OF THE PREFERRED EMBODIMENT

A preferred embodiment according to the present invention will be described hereunder with reference to the drawings.

In the following description, a case where the present invention is applied to a weather resistance test apparatus will be described, however, it is needless to say that apparatus to which the present invention is applied are not limited to this weather resistance apparatus.

Figure 1:
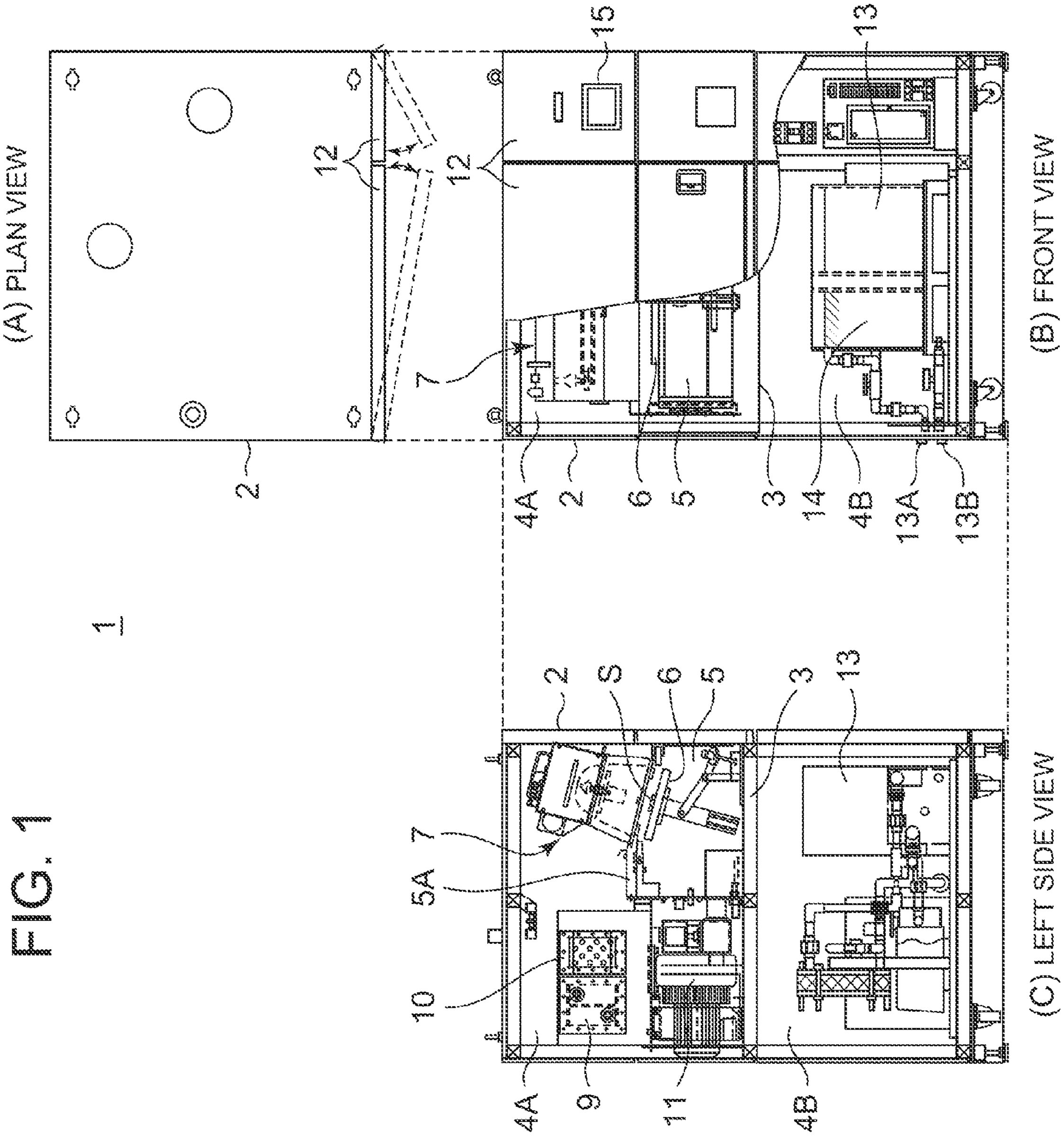
FIG. 1 is a diagram showing the construction of a weather resistance test apparatus, wherein (A) is a plan view, (B) is a partially cut-out front view and (C) is a side view showing the inside of the apparatus when viewed from the left side.

FIG. 1 is a diagram showing the construction of a weather resistance test apparatus 1 according to an embodiment of the present invention. In FIG. 1, (A) is a plan view of the weather resistance test apparatus 1, (B) is a partially cut-out front view, and (C) is a side view showing the inside of the apparatus when the apparatus is viewed from the left side.

The weather resistance test apparatus 1 is an example of an ultraviolet irradiating apparatus, and this apparatus is configured so that the same ambient condition as a condition under which a sample (target) S is placed outdoors can be created to test weather resistance of the sample S by irradiating the sample S with ultraviolet light, adjusting temperature or humidity, setting a rainfall condition or the like.

That is, as shown in FIG. 1, the weather resistance test apparatus 1 has a box-shaped apparatus housing 2 (hereinafter referred to as “housing 2”), and the inside of the housing 2 is vertically compartmented into an upper chamber 4A and a lower chamber 4B by a partition plate 3. In the upper chamber 4A are mounted a sample chamber 5 for accommodating a sample S therein, a sample table 6 which is provided in the sample chamber 5 so that the sample S is mounted on the sample table 5, an ultraviolet irradiator 7 for irradiating the sample S with ultraviolet light, a cooler 9 and a heater 10 that adjust the ambient temperature and humidity of the sample chamber 5 in accordance with a weather resistance test, and a blower 11 for circulating air among the sample chamber 5, the cooler 9 and the heater 10.

The ultraviolet irradiator 7 is secured to the ceiling face 5A of the sample chamber 5, and the sample table 6 is disposed so as to confront the ultraviolet irradiator 7, whereby the sample S disposed on the sample table 6 is irradiated with ultraviolet light from the ultraviolet irradiator 7.

An opening/closing door 12 for a work of freely incorporating and dismounting the ultraviolet irradiator 7 into and from the upper chamber 4A is provided to the front side of the upper chamber 4A of the housing 2, and the ultraviolet irradiator 7 is disposed to be adjacent to the opening/closing door 12, whereby the incorporating/dismounting work can be facilitated.

Furthermore, a water tank 13 for stocking cooling water for a water-cooling jacket 31 and a water-cooling pip 40 (FIG. 2) which are provided to the ultraviolet irradiator 7 and described later are mounted in the lower chamber 4B. A water supply pipe connection pipe 13A to which a water supply pipe such as a tap water pipe or the like is connected to supply water to the water tank 13, and a water distributing pipe 13B for distributing water from the water tank 13 to the outside are connected to the water tank 13. A pump 14 for circulating cooling water into the water-cooling jacket 31 and the water-cooling pipe 40 is disposed in juxtaposition with the water tank 13.

A touch panel type control panel 15 is mounted on the front side of the housing 2 of the weather resistance test apparatus 1, and various kinds of information are displayed on the control panel 15. In addition, required indications (information on temperature, humidity, an ultraviolet light amount, a test time, etc., for example) are input from the control panel 15.

Figure 2:
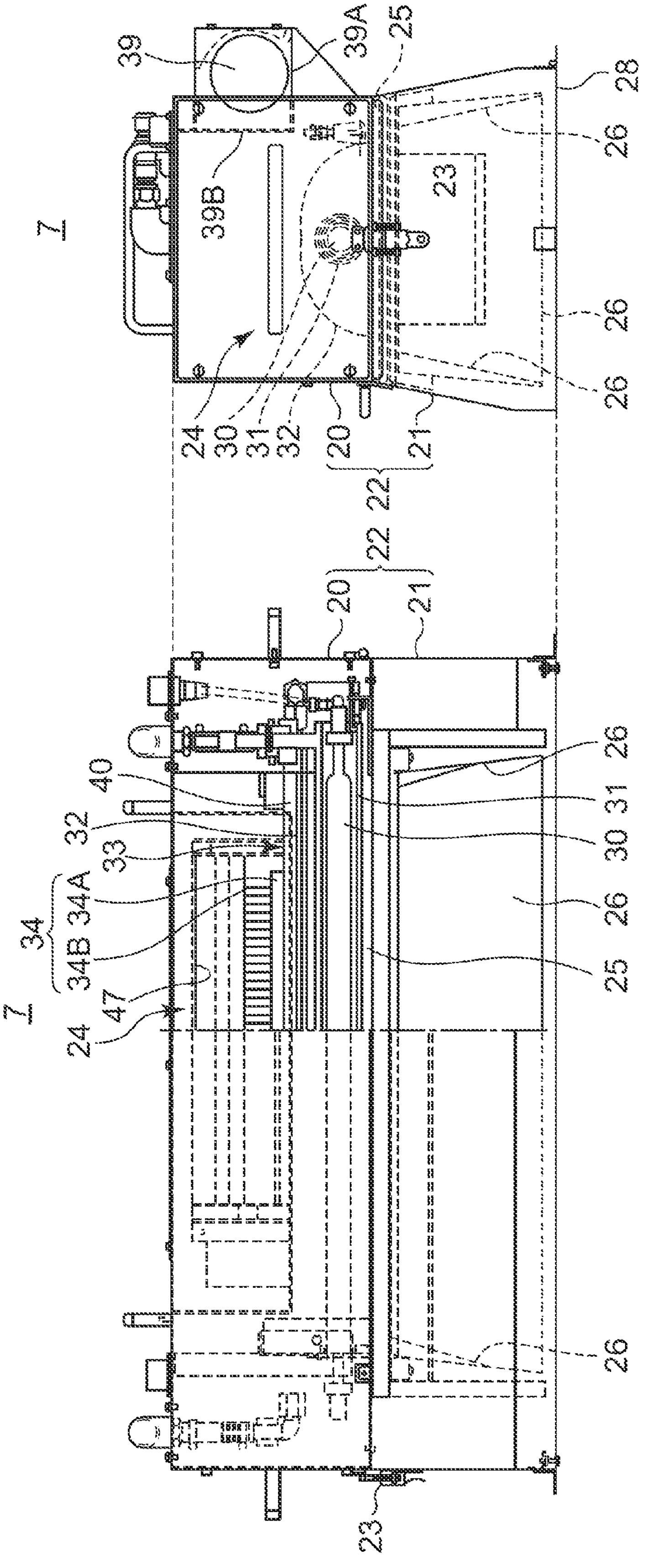
FIG. 2 is a diagram showing the construction of an ultraviolet irradiator, wherein (A) is a partially cut-out front view, and (B) is a right side view.

FIG. 2 is a diagram showing the construction of the ultraviolet irradiator 7. In FIG. 2, (A) is a partially cut-out front view of the ultraviolet irradiator 7, and (B) is a right side view of the ultraviolet irradiator 7.

The ultraviolet irradiator 7 has a metal housing 22. The housing 22 has a light source case body 20 having a rectangular parallelepiped shape whose bottom surface is opened, and an auxiliary reflection plate accommodating case body 21 whose upper and bottom surfaces are opened. The auxiliary reflection plate accommodating case body 21 is joined to the bottom surface side of the light source case body 20 by a latch 23. A light source unit 24 for emitting ultraviolet light to the bottom surface side is disposed in the light source case body 20, and a flat plate type thin film filter 25 is disposed at the bottom surface side of the light source unit 24.

The thin film filter 25 is an ultraviolet transmissible filter for transmitting therethrough light having wavelengths of an ultraviolet region required for the weather resistance test, and it is achieved by forming an ultraviolet transmissible filter material having excellent heat resistance such as a dielectric multilayer film or the like on the surface of a quartz glass plate transparent to ultraviolet light, for example. Light emitted from the light source unit 24 passes through the thin film filter 25, whereby the light is converted to a desired ultraviolet region component (that is, only a desired ultraviolet region component of the light passes through the thin film filter 25), and then guided to the auxiliary reflection plate accommodating case body 21.

The opening of the bottom surface of the auxiliary reflection plate accommodating case body 21 serves as an ultraviolet irradiation port 28 for irradiating a target with ultraviolet light, and it is closed by a quartz glass window plate 27 (FIG. 4) through which ultraviolet light is transmitted. The auxiliary reflection plate accommodating case body 21 is provided with auxiliary reflection plates 26 along the respective inner side surfaces (the four inner surfaces of the front and back surfaces and the right and left side surfaces) of the auxiliary reflection plate accommodating case body 21. The auxiliary reflection plates 26 are disposed between the ultraviolet irradiation port 28 and the ultraviolet lamp 30 so that the illuminance distribution on the sample table 6 is adjusted to be uniform. Accordingly, uniform irradiation light is emitted from the ultraviolet irradiation port 28 by direct light which is directly incident from the thin film filter 25 to the bottom surface and reflection light reflected from the auxiliary reflection plate 26.

Figure 3:
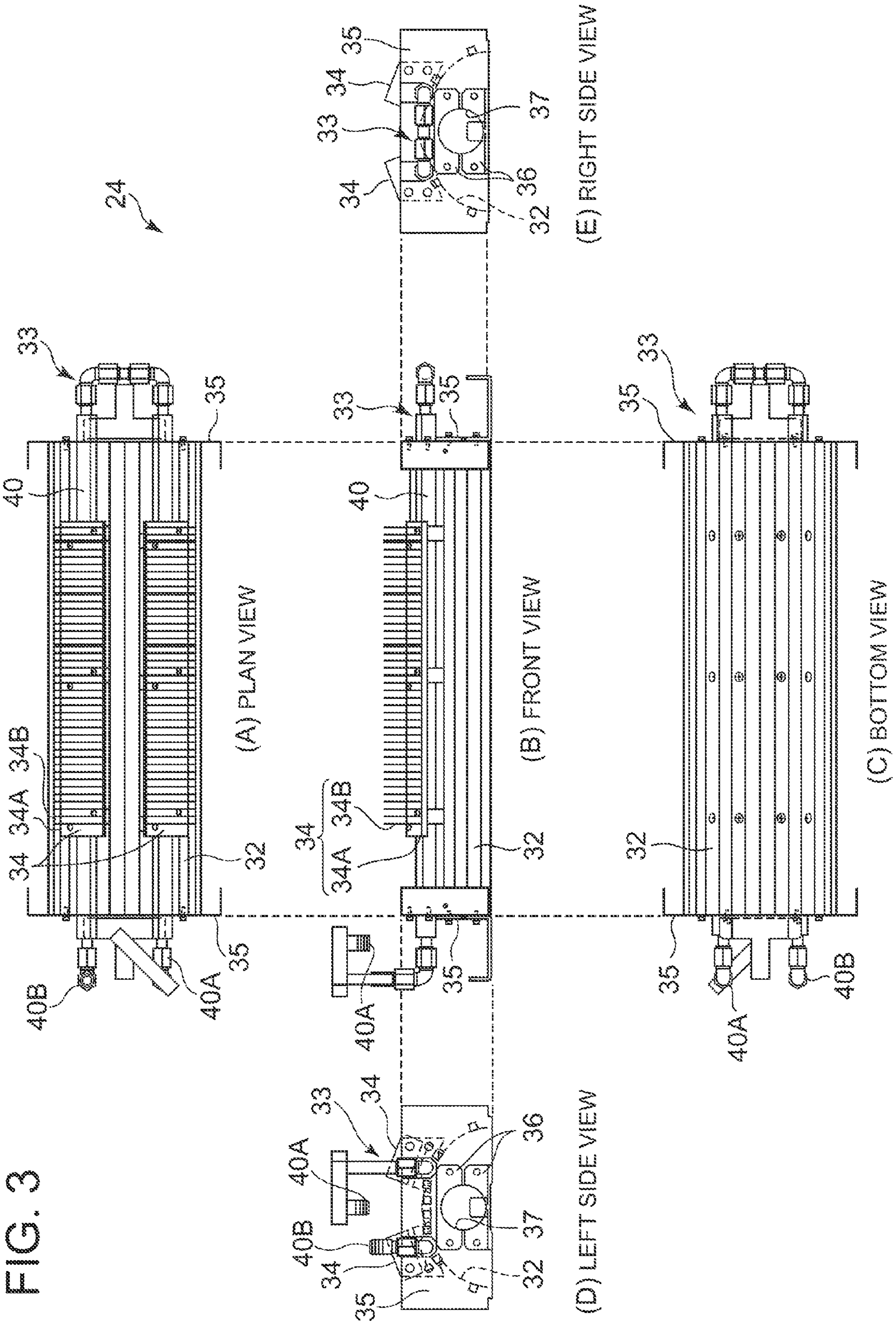
FIG. 3 is a diagram showing the construction of a light source unit, wherein (a) is a plan view, (B) is a front view, (C) is a bottom view, (D) is a left side view and (E) is a right side view.

FIG. 3 is a diagram showing the construction of the light source unit 24. In FIG. 3, (A) to (E) are plan view, front view, bottom view, left side view and right side view of the light source unit 24, respectively. Furthermore, FIG. 3 shows a state that an ultraviolet lamp 30 and a water-cooling jacket 31 described later are detached.

The light source unit 24 has the ultraviolet lamp 30 (FIG. 2), the water-cooling jacket 31 (FIG. 2), a main reflection plate 32, a water cooling mechanism 33, a heat sink 34 and an air blower 39 (FIG. 2).

As shown in FIG. 2, the ultraviolet lamp 30 is a straight pipe (tube) type metal halide lamp, for example, and it is disposed in a landscape water-cooling jacket 31 (extending in the right-and-left direction in front view of FIG. 2). As described later, the ultraviolet lamp 30 is incorporated in the water-cooling jacket 31 of the ultraviolet irradiator 7 so as to be freely installable into and dismountable from the water-cooling jacket 31 of the ultraviolet irradiator 7. The water-cooling jacket 31 comprises a dual pipe formed of quartz glass. Cooling water is introduced from one end of the dual pipe into the gap between the outer pipe and the inner pipe, and discharged from the other end of the dual pipe to the outside of the ultraviolet irradiator 7. The ultraviolet lamp 30 is inserted and mounted in the hollow portion of the inner pipe of the water-cooling jacket 31.

End plates 35 are disposed at both the ends of the light source unit 24, and each plate 35 is provided with jacket support plates 36 having an insertion opening 37 for the water-cooling jacket 31, and the water-cooling jacket 31 is supported at both the ends thereof by the jacket support plates 36. The ultraviolet lamp 30 in the water-cooling jacket 31 is freely insertable and detachable independently through the insertion openings 37.

Figure 4:
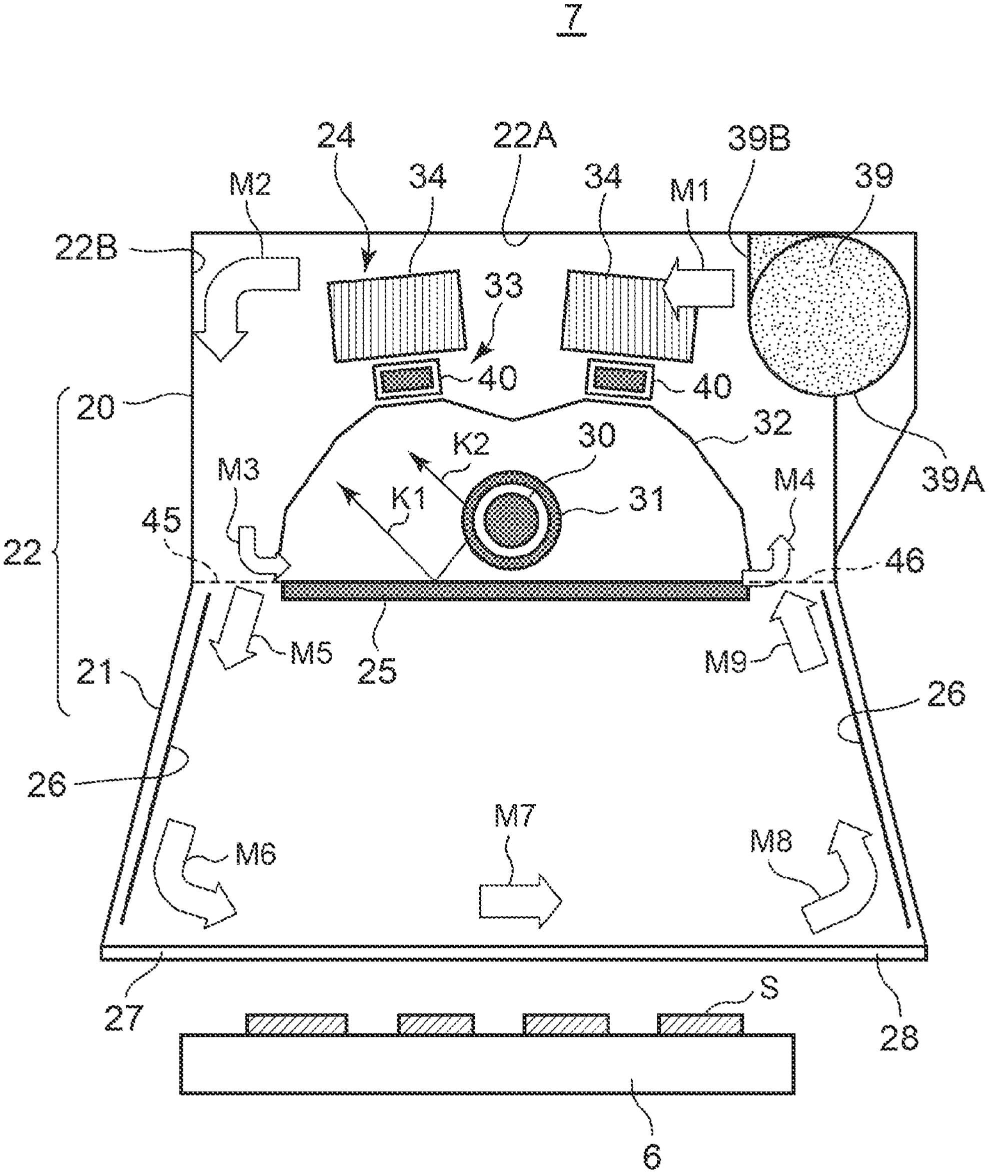
FIG. 4 is a diagram showing the construction of the ultraviolet irradiator and air circulation in a housing.

FIG. 4 is a cross-sectional view showing the construction of the ultraviolet irradiator 7 when the cross-section is taken in a direction perpendicular to the pipe axis of the ultraviolet lamp 30, and also shows the arrangement of constituent members, flow of air streams in the ultraviolet irradiator 7 and the positional relationship between the sample table 6 and the ultraviolet irradiator 7.

The main reflection plate 32 is a reflection plate which is designed to be substantially U-shaped in cross-section and extend along the ultraviolet lamp 30. The main reflection plate 32 is provided so as to surround the upper side of the ultraviolet lamp 30 from both the sides of the ultraviolet lamp 30 between the end plates 35 at both the ends, and reflects light to the thin film filter which is disposed at the opposite side (lower side (bottom side)) with respect to the ultraviolet lamp 30. The main reflection plate 32 is constructed by a so-called metal dichroic mirror having an optical characteristic that light of an ultraviolet region component is mainly reflected and light of an infrared region component is absorbed.

The metal dichroic mirror is constructed as follows. A reflection side surface of a metal base material is covered with IR (heat) absorption film which absorbs infrared ray or heat ray and constructed by a metal thin film according to a special deposition method or the like, and a dielectric multilayer film for reflecting the ultraviolet region component is provided on the IR absorption film.

That is, the main reflection plate 32 absorbs infrared ray and heat ray. Therefore, infrared ray K1 (a part of radiant light emitted from the light source unit 24) which is not passed through the thin film filter 25, but reflected from the thin film filter 25 is incident to the main reflection plate 32 and absorbed there. Furthermore, infrared ray K2 which is emitted from the ultraviolet lamp 30 and directly travels to the main reflection plate 32 is also absorbed by the main reflection plate 32. Accordingly, the infrared ray and the heat ray emitted from the ultraviolet lamp 30 surrounded by the main reflection plate 32 and the thin film filter 25 are absorbed by the main reflection plate 32, and thus they are not directly applied to the housing 22, so that the temperature of the housing 22 can be prevented from increasing.

The water cooling mechanism 33 is a heat withdrawing mechanism for withdrawing heat of the main reflection plate 32 and discharging the heat to the outside of the ultraviolet irradiator 7. As shown in FIG. 3, the water cooling mechanism 33 has the U-shaped water-cooling pipe 40 having a cooling water introducing port 40A and a cooling water discharging port 40B at the left end portion of the main reflection plate 32. The U-shaped water-cooling pipe 40 is designed to extend from the cooling water introducing port 40A to the right end portion side of the main reflection plate 32 along the main reflection plate 32, fold back at the outside of the right end portion of the main reflection plate 32, extend from the right end portion side of the main reflection plate 32 to the left end portion side of the main reflection plate 32 and then return to the cooling water discharge port 40B. The water-cooling pipe 40 is disposed in contact with the upper surface of the main reflection plate 32 (the back surface side when viewed from the ultraviolet lamp 30 side), and the pump 14 provided to the weather resistance test apparatus 1 is connected to the introducing port 40A and the discharging port 40B. Accordingly, tap water stocked in the water tank 13 is circulatively supplied through the water-cooling pipe 40 to withdraw heat of the main reflection plate 32, and returned to the water tank 13 at the outside of the ultraviolet irradiator 7.

The water-cooling jacket 31 is also connected to the pump 14, and cooling water of the water-cooling jacket 31 is also circulated by the pump 14.

As described above, the main reflection plate 32 is cooled by the water cooling mechanism 33. Therefore, even when the main reflection plate 32 is disposed so as to surround the ultraviolet lamp 30 and configured so as to absorb infrared ray and heat ray of the ultraviolet lamp 30, increase of the temperature of the main reflection plate 32 can be suppressed.

The heat sink 34 is a heat transfer member for transferring the ambient heat of the inside of the housing 22 to the water-cooling pipe 40 of the water cooling mechanism 33 and making the water cooling mechanism 33 withdraw the transferred heat. The heat sink 34 has a plate-like base body 34A which extends along the water-cooling pipe 40 in close contact with the water-cooling pipe 40, and many fins 34B provided on the upper surface of the plate-like base body 34A. The plate-like base body 34A is cooled by the water-cooling pipe 40, and the temperature of the fins 34B is higher than that of the plate-like base body 34A, so that the ambient heat is transferred through the fins 34B to the plate-like base body 34A and then withdrawn by the water-cooling pipe 40.

The air blower 39 promotes heat transfer of the ambient heat to the heat sink 34, and enhances the efficiency of the withdrawal of the ambient heat. Specifically, the air blower 39 is a cross flow fan, and it is secured to a side surface at the back side (the side confronting the front side) of the light source case body 20. An air blow-out opening 47 (FIG. 2) which extends along the heat sink 34 so as to be longer than the heat sink 34 is formed in the side surface, and an air suction opening (not shown) which extends in parallel to the air blow-out opening 47 is formed at the lower side of the air blow-out port 47 in the side surface. The air blower 39 sucks air in the light source case body 20 through the air suction opening port to the suction side 39A, and blows the air from the blow-out side 39B through the air blow-out opening 47 to the fins 34B of the heat sink 34, whereby the heat of the air is withdrawn through the heat sink 34 by the water cooling mechanism 33. Through the operation of this air blower 39, air is circulated in the housing 22.

According to this embodiment, as shown in FIG. 4, the air blower 39 blows an air stream M1 into the gap between the top surface 22A of the housing 22 and the light source unit 24 in the direction perpendicular to the extension direction of the heat sinks 34, whereby the air stream M1 passes through the heat sinks 34 and then impinges against the confronting side surface 22B, whereby an air stream M2 flowing to the bottom surface side is generated. The air stream M2 goes around to the gap between the main reflection plate 32 and the thin film filter 25, passes along the main reflection plate 32 and then is sucked to the air blower 39, whereby an air stream M3 and an air stream M4 are generated. The main reflection plate 32 is cooled by the air stream M2, the air stream M3 and the air stream M4, and the air stream M2 to the air stream M4 are blown to the heat sinks 34 by the air blower 39, whereby the heat generated from the main reflection plate 32 and the ambient heat around the ultraviolet lamp 30 are withdrawn and efficiently transferred from the heat sinks 34 to the water cooling mechanism 33.

The auxiliary reflection plate accommodating case body 21 is provided with an air introducing port 45 and an air discharging port 46 through which the air circulated in the light source case body 20 is introduced and circulated into the auxiliary reflection plate accommodating case body 21. an air stream M5 (a part of the air stream M2) is introduced from the air introducing port 45 into the auxiliary reflection plate accommodating case body 21. This air stream M5 downwardly flows along the auxiliary reflection plate 26 of the auxiliary reflection plate accommodating case body 21 which is located at the opposite side to the air blower 39 side, and reaches, as an air stream M6, the quartz glass window plate 27 at the bottom surface, and the auxiliary reflection plate accommodating case body 21 is cooled by the air stream M6. The air stream M6 passes above and along the quartz glass window plate 27 and reaches the auxiliary reflection plate 26 at the air blower 39 side as an air stream M7 and an air stream M8. Furthermore, the air stream M8 upwardly flows along the auxiliary reflection plate 26, and is discharged from the air discharge port 46 and sucked into the air blower 39 as an air stream M9. The air stream M9 is blown to the heat sinks 34 by the air blower 39, whereby the heat of the auxiliary reflection plates 26, etc. of the auxiliary reflection plate accommodating case body 21 is transferred through the heat sinks 34 to the water cooling mechanism 33 to be withdrawn.

Furthermore, as described above, the air blower 39 blows air to the heat sinks 34 over the whole length of the heat sinks 34 in the direction perpendicular to the extending direction of the ultraviolet lamp 30, the main reflection plate 32 and the heat sinks 34, and thus the whole bodies of the ultraviolet lamp 30, the main reflection plate 32 and the heat sinks 34 can be broadly cooled.

Figures 5A, 5B:
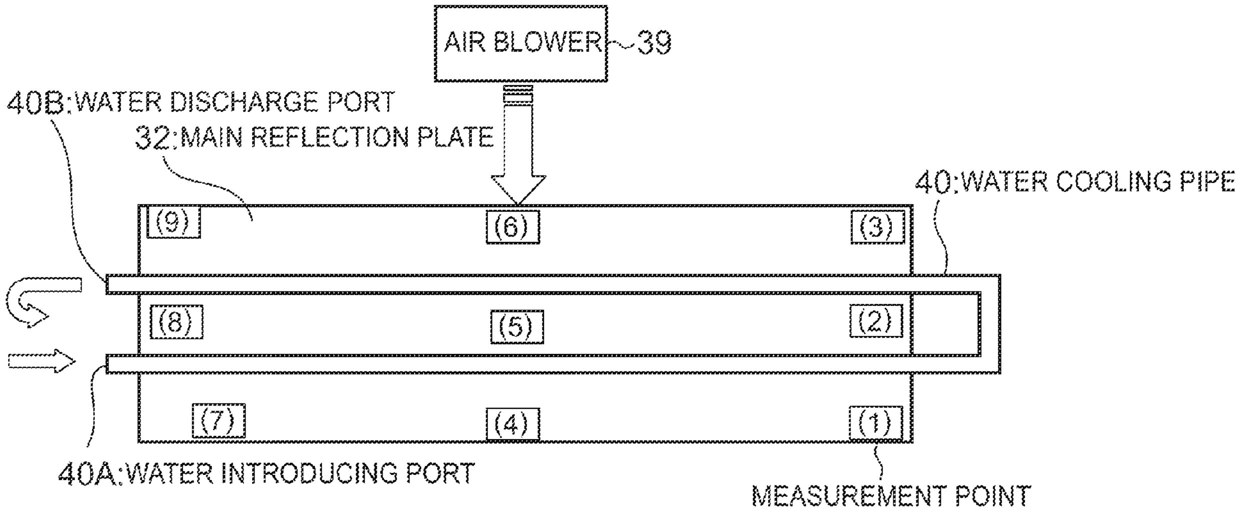
FIG. 5A shows temperature measurement points in a temperature estimating test for a main reflection plate of the ultraviolet irradiator.
FIG. 5B is a table showing a temperature estimating test result (temperature) at each measurement point.

FIGS. 5A and 5B show a temperature estimation test result of the main reflection plate 32 of the ultraviolet irradiator 7, wherein FIG. 5A shows measurement points of temperature, and FIG. 5B shows the temperature at each measurement point.

This temperature estimation test was performed while the presence or absence of the air blowing operation of the air blower 39 and the presence or absence of air flow from the light source case body 20 to the auxiliary reflection plate accommodating case body 21 were changed under the condition that the lamp power of the ultraviolet lamp 30 was set to 6 kw and the temperature of cooling water circulated through the water-cooling jacket and the water-cooling pipe 40 was set to 30° C. The heat-resistant temperature of the main reflection plate 32 of this embodiment is equal to 200° C. at maximum, and the main reflection plate 32 may suffer thermal damage or deformation when the temperature exceeds 200° C. Furthermore, with respect to the lamp power and the thermal condition such as the cooling water temperature, a pretest was performed to measure the temperature at each measurement point with changing the lamp power, the cooling water temperature and the cooling water amount under the state that air was blown by the air blower 39, and there was adopted a condition under which relatively high temperatures were measured in a temperature range which did not exceed the heat-resistant temperature of the main reflection plate 32 in the pretest.

In FIG. 5B, a test 1 corresponds to a condition that the ultraviolet lamp 30 was turned on under the state that the air blower 39 was turned on and the air flow from the light source case body 20 to the auxiliary reflection plate accommodating case body 21 was interrupted (the air introducing port 45 and the air discharging port 46 were closed). A test 3 corresponds to a condition that the ultraviolet lamp 30 was turned on under the state that the air flow from the light source case body 20 to the auxiliary reflection plate accommodating case body 21 is allowed in the test 1.

In these tests 1 and 3, the temperature of the main reflection plate 32 were suppressed to the heat-resistant temperature of the main reflection plate 32 or less at all the measurement points (1) to (9). Particularly, the temperature of the main reflection plate 32 is excellently suppressed even at the measurement point (6) which is in the neighborhood of the center of the ultraviolet lamp 30 and to which heat in the housing 22 was directly applied.

On the other hand, a test 2 corresponds to a condition that the ultraviolet lamp 30 was turned on under the state that the air blower 39 is turned off. Furthermore, in the test 2, the temperature of the main reflection plate 32 at the measurement point (6) reached about 200° C. in several minutes immediately after the ultraviolet lamp 30 was turned on although the main reflection plate 32 was subjected to water cooling, and thus the test was stopped to protect the main reflection plate 32 without waiting for saturation of temperature increase.

According to the comparison of these tests 1 and 2, air is circulated in the housing 22 by the air blower 39 to cool the main reflection plate 32, and the air M4 which withdraws heat through the main reflection plate 32 is blown to the heat sink 34, whereby the water cooling mechanism 33 (water-cooling pipe 40) withdraws the heat. Accordingly, it is found that the heat of the main reflection plate 32 is efficiently withdrawn by the water cooling mechanism 33 so that the main reflection plate 32 can be kept to a proper temperature.

According to the comparison of the tests 1 and 3, even when air is made to flow from the light source case body 20 to the auxiliary reflection plate accommodating case body 21, there occurs no significant temperature difference in the main reflection plate 32 between the tests 1 and 3, and the cooling performance of the main reflection plate 32 can be maintained.

FIG. 6 is a table showing measurement results of the temperature of the auxiliary reflection plate 26, the ambient temperature in the housing 22 of the ultraviolet irradiator 7, the temperature of the housing 22 and the temperature of the housing 2 of the ultraviolet irradiating apparatus 1 in the respective tests of FIG. 5. The temperature of the auxiliary reflection plate 26 is determined by averaging the surface temperatures of the center portions of the respective auxiliary reflection plates 26 provided on the four surfaces of the front surface, back surface and right and left side surfaces of the auxiliary reflection plate accommodating case body 21, the temperature of the housing 22 of the ultraviolet irradiator 7 represents the surface temperature of the center of the outside upper surface of the housing 22, and the temperature of the housing 2 of the ultraviolet irradiating apparatus 1 represents the surface temperature of the center of the outside front surface of the housing 2.

As shown in FIG. 6, according to the comparison of the tests 1 and 3, it is found that the temperature of the auxiliary reflection plate 26 is lowered and cooled by making air flow from the light source case body 20 to the auxiliary reflection plate accommodating case body 21.

As described above, even when air is made to flow from the light source case body 20 to the auxiliary reflection plate accommodating case body 21, the cooling performance of the main reflection plate 32 can be maintained, and thus it is found that both the main reflection plate 32 and the auxiliary reflection plates 26 can be efficiently cooled by making air flow to the auxiliary reflection plate accommodating case body 21.

With respect to the ambient temperature in the housing 22 of the ultraviolet irradiator 7, according to the comparison of the tests 1, 3 (air is made to flow) and the test 2 (no air flow), air is circulated by the air blower 39 and air in the housing 22 is blown to the heat sink 34, whereby ambient heat of the housing 22 is withdrawn through the heat sink 34 by the water cooling mechanism 33, and the ambient temperature can be reduced significantly.

In all the tests 1 to 3, the temperature of the housing 2 of the weather resistance test apparatus 1 is suppressed to substantially about 30° C., and even when a user touches the housing 2 by his/her hand, the user does not feel heat.

Described specifically, the ultraviolet irradiator 7 is disposed to be adjacent to the open/close door 12 as the side surface at the front side of the weather resistance test apparatus 1. Therefore, when the temperature of the housing 22 of the ultraviolet irradiator 7 increases, the temperature of the open/close door 12 also increases, and the user cannot easily touch the open/close door 12.

On the other hand, according to this embodiment, the heat of each part of the ultraviolet irradiator 7 is efficiently withdrawn by the water cooling mechanism 33, and discharged to the outside (for example, the water tank 13 or the like). Therefore, the temperature of the housing 22 of the ultraviolet irradiator 7 is suppressed, so that the temperature of the housing 2 of the weather resistance test apparatus 1 is also suppressed.

Furthermore, since the temperature of the ultraviolet irradiator 7 is suppressed and the heat is discharged to the outside by the water cooling mechanism 33, it is unnecessary to take a countermeasure to heat for the ultraviolet irradiator 7 in the weather resistance test apparatus 1 incorporated with the ultraviolet irradiator 7, so that the construction of the apparatus can be simplified and the cost thereof can be reduced.

Here, it is necessary to exchange the ultraviolet lamp 30 for a new one due to aged deterioration every time some degree of turn-on time elapses. The ultraviolet lamp 30 is incorporated in the ultraviolet irradiator 7, and thus when the ultraviolet lamp 30 is exchanged, it has been hitherto necessary to temporarily dismount the ultraviolet irradiator 7 from the weather resistance test apparatus 1 to execute an exchange work. Specifically, with respect to even the conventional ultraviolet irradiator in which the colored glass filter is mounted in the water-cooling jacket 31, the colored glass filter is deteriorated by ultraviolet rays in a shorter time as compared with the thin film filter 25 described above, and thus the transmissivity of the colored glass filter is lowered. Accordingly, the conventional apparatus could not exercise its performance as an apparatus unless the colored glass filter is exchanged together with the ultraviolet lamp 30. Therefore, the colored glass filter is exchanged together with the water-cooling jacket 31 at the same time when the ultraviolet lamp 30 is exchanged. Accordingly, it has been hitherto necessary to temporarily dismount the ultraviolet irradiator from the weather resistance test apparatus when the ultraviolet lamp 30 is exchanged.

However, since the weight of the ultraviolet irradiator 7 is large, it causes a risk to hold up or take down the ultraviolet irradiator 7 for dismounting or incorporation of the ultraviolet irradiator 7, and much time is required for a lamp exchange work.

On the other hand, according to the weather resistance test apparatus 1 of this embodiment, the ultraviolet lamp 30 can be exchanged while the ultraviolet irradiator 7 is kept incorporated in the weather resistance test apparatus 1.

Figure 7:
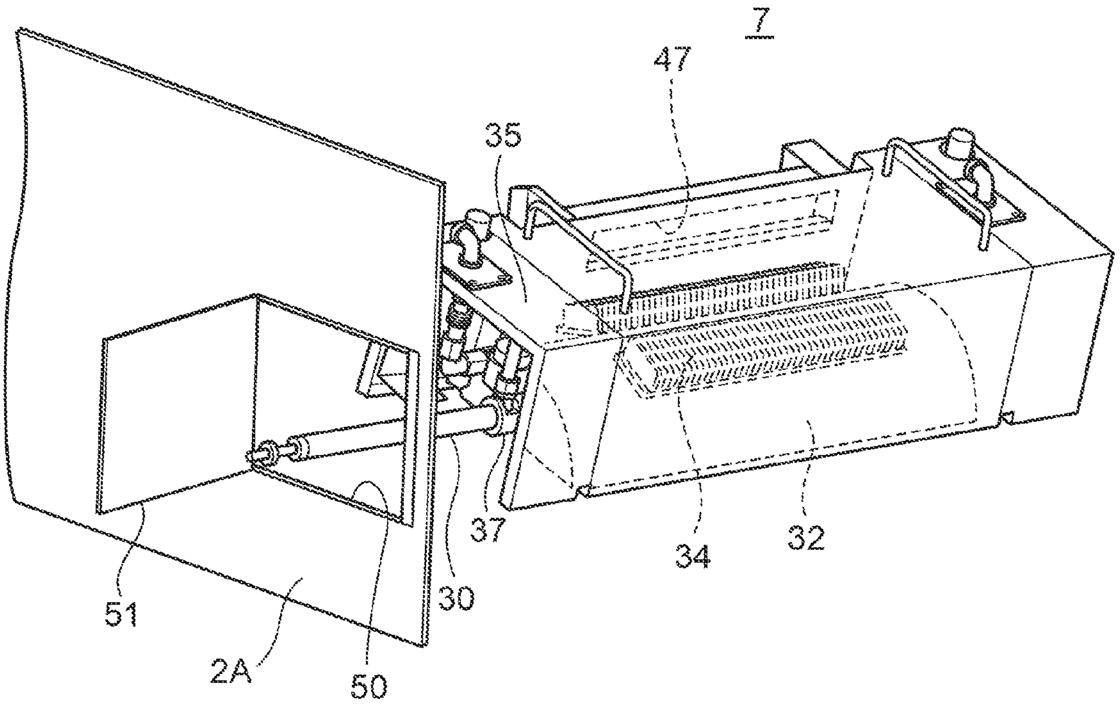
FIG. 7 is a diagram showing exchange of an ultraviolet lamp in the weather resistance test apparatus.

That is, as shown in FIG. 7, the ultraviolet irradiator 7 is configured so that the ultraviolet lamp 30 is freely insertable and dismountable through the insertion opening 37 of the end plate 35 at the end portion. Furthermore, the weather resistance test apparatus 1 is configured so that an opening 50 is formed in the side surface 2A of the housing 2 so as to face the end plate 35 of the ultraviolet irradiator 7, and a lamp exchange door 51 is secured to the opening 50.

Accordingly, when the ultraviolet lamp 30 is exchanged, the ultraviolet irradiator 7 is not required to be dismounted from the weather resistance test apparatus 1, and the ultraviolet lamp can be exchanged by merely opening the lamp exchange door 51 to expose the end plate 35 of the ultraviolet irradiator 7 to the outside and pulling out only the ultraviolet lamp 30 from the insertion opening 37 of the endplate 35 through the opening 50 to the outside. Therefore, the lamp exchange work can be simplified and performed safely in a short time.

Particularly, in the ultraviolet irradiator 7 according to this embodiment, a colored glass filter is not disposed in the water-cooling jacket 31, but the thin film filter 25 which is hardly deteriorated by ultraviolet light as compared with the colored glass filter. Therefore, when the ultraviolet lamp 30 is exchanged, it is unnecessary to exchange the water-cooling jacket 31 unlike the prior arts, and also only the ultraviolet lamp 30 can be simply exchanged from the lamp exchange door 51 of the weather resistance test apparatus 1.

As described above, according to this embodiment, the weather resistance test apparatus 1 is provided with the water cooling mechanism 33 as an example of the heat withdrawal mechanism for withdrawing the heat of the main reflection plate 32 and discharging the withdrawn heat to the outside of the housing 22, and the heat sink 34 as a heat transfer body for transferring the ambient heat in the housing 22 to the water cooling mechanism 33 to withdraw the heat to the water cooling mechanism 33.

According to this construction, the heat of the main reflection plate 32 is withdrawn by the water cooling mechanism 33, and discharged to the outside of the housing 22. Therefore, the main reflection plate 32 can be prevented from being thermally damaged or thermally deformed. Furthermore, the ambient heat in the housing 22 is withdrawn through the heat sink 34 to the water cooling mechanism 33, so that the temperature increase in the housing 22 can be moderated and the temperature in the housing can be kept to a proper temperature.

Furthermore, according to this embodiment, the air blower 39 for circulating air in the housing 22 to cool the main reflection plate 32 is provided. The air blower 39 is configured to suck the air M4 which flows along the main reflection plate 32 and withdraws the heat of the main reflection 32 and blows the air M to the heat sink 34. According to this configuration, the ambient heat in the housing 22 can be efficiently transferred to the water cooling mechanism 33 through the heat sink 34, and discharged to the outside. Accordingly, the temperature increase in the housing 22 can be efficiently suppressed.

Still furthermore, according to this embodiment, the ultraviolet lamp 30 is designed in a pipe-like (tubular) shape, the main reflection plate 32 and the heat sink 34 extend along the ultraviolet lamp 30, and the air blower 39 blows air to the heat sink 34 from the direction perpendicular to the extension direction of the heat sink 34. Accordingly, the air can be widely blown to the main reflection plate 32 over the whole length of the main reflection plate 32, and the heat can be efficiently withdrawn by the heat sink 34.

Still furthermore, according to this embodiment, the auxiliary reflection plates 26 for adjusting the illuminance distribution are provided between the ultraviolet irradiation port 28 of the housing 22 and the ultraviolet lamp 30, and the air circulated in the housing 22 flows via the auxiliary reflection plates 26 to cool the auxiliary reflection plates 26 and sucked into the air blower 39. According to this configuration, the auxiliary reflection plates 26 can be also efficiently cooled in addition to the main reflection plate 32.

According to this embodiment, the thin film filter 25 as the ultraviolet transmission filter for transmitting therethrough only light of a predetermined ultraviolet region component out of light emitted from the ultraviolet lamp 30 and reflection light from the main reflection plate 32 is provided between the ultraviolet irradiation port 28 of the housing 22 and the ultraviolet lamp 30, and the main reflection plate 32 is configured to absorb light of regions other than at least the predetermined ultraviolet region.

According to this configuration, infrared ray which does not pass through the thin film filter 25 and thus is reflected from the thin film filter 25 and infrared ray emitted from the ultraviolet lamp 30 are absorbed by the main reflection plate 32, and thus the irradiation amount of the infrared ray to the housing 22 is suppressed, so that the temperature increase of the housing 22 can be suppressed.

Furthermore, the ultraviolet irradiator 7 can be freely incorporated in the weather resistance test apparatus 1 having the sample chamber 5 containing the sample S, and the sample S in the sample chamber 5 is irradiated with ultraviolet ray of the ultraviolet irradiator 7.

Accordingly, the heat of the ultraviolet irradiator 7 is efficiently withdrawn by the water cooling mechanism 33, so that a thermal load imposed on the weather resistance test apparatus 1 is small, the temperature, etc. of the sample chamber 5 are not adversely affected and it is unnecessary to enhance the cooling performance of the weather resistance test apparatus 1. Accordingly, the ultraviolet irradiator 7 can be easily incorporated.

The embodiment described above is an example of the present invention, and any modification and application may be made without departing from the subject matter of the present invention.

For example, in the above embodiment, the U-shaped water-cooling pipe 40 is brought into contact with the main reflection plate 32 to withdraw the heat of the main reflection plate 32. However, the present invention is not limited to this configuration. For example, the water-cooling pipe 40 may be designed to be meandered on the back surface of the main reflection plate 32 or may be designed to reciprocate several times between both the right and left ends of the main reflection plate 32. Or, the cooling performance of water-cooling the main reflection plate 32 may be enhanced by using plural water-cooling pipes 40 so that the temperature of the main reflection plate 32 is prevented from exceeding the heatproof temperature even under the state that the air blower 39 is not actuated.

Furthermore, in place of the water cooling using the water-cooling pipe 40, any heat withdrawing mechanism such as a heat pipe or the like may be used.

In the above embodiment, only one air blow-out opening 47 having the same length as the whole length of the heat sink 34 is provided. However, the present invention is not limited to this embodiment. For example, plural air blow-out openings 47 may be provided along the extension direction of the heat sink 34, or the air blower 39 may be disposed every air blow-out opening 47.

Furthermore, in the above embodiment, the weather resistance test apparatus is exemplified as an example of the ultraviolet illumination device according to the present invention. However, the present invention is not limited to this embodiment, and the present invention may be broadly applied to various kinds of ultraviolet illumination devices such as a device for applying ultraviolet ray for a material processing for the purpose of ultraviolet cleaning or reform of the surface of a sample.

As described above, according to the above embodiment, the ultraviolet transmissible filter is disposed between the ultraviolet irradiator and the target (sample) in place of the configuration that the colored glass filter is disposed in the water-cooling jacket. In this case, even when the ultraviolet transmissible filter is deteriorated by ultraviolet light, only the ultraviolet transmissible filter may be exchanged by a new one without exchanging the water-cooling jacket. Accordingly, the problem of the running cost can be overcome.

In the configuration that the colored glass filter is provided between the ultraviolet lamp and the reflection plate, the infrared region component and the visible region component are absorbed by the colored glass filter, and thus the heat generated by the infrared region component and the visible region component of the ultraviolet lamp is transferred and withdrawn through the colored glass filter to the water-cooling jacket. However, when no colored glass filter is interposed between the ultraviolet lamp and the reflection plate, the infrared region component and the visible region component are directly applied to the reflection plate. Therefore, there may occur a new problem that the reflection plate is heated to a high temperature and thus deformed.

Furthermore, when the colored glass filter is omitted, the ambient temperature in the housing of the ultraviolet irradiator is increased by light of the infrared region component and the visible region component, which may cause a new problem that built-in parts are damaged. However, according to the embodiment of the present invention, the water cooling mechanism (the water-cooling pipe 40) and the heat transfer body (the heat sinks 34), the air blower, etc. described above are provided, so that the reflection plate and the ambient air in the housing of the ultraviolet irradiator can be efficiently cooled. Therefore, deformation of the reflection plate is prevented and the internal temperature of the housing can be kept to a proper temperature as described above. Furthermore, it is needless to say that the water cooling mechanism may be also applied to a case where a colored glass filter is used.

What is claimed is:

1. An ultraviolet irradiator for irradiating a target with ultraviolet light, comprising:

- a housing having an ultraviolet irradiation port through which the target is irradiated with the ultraviolet light;
- an ultraviolet lamp that emits ultraviolet light;
- a water-cooling jacket in which the ultraviolet lamp is mounted;
- a reflection plate that reflects light emitted from the ultraviolet lamp, the ultraviolet lamp, the water-cooling jacket and the reflection plate being mounted in the housing, and ultraviolet light emitted directly from the ultraviolet lamp and reflection light reflected from the reflection plate being irradiated to the outside of the housing;
- a heat withdrawing mechanism that withdraws heat of the reflection plate and discharges the heat to the outside of the housing;
- a heat transfer member that transfers ambient heat in the housing to the heat withdrawing mechanism so that the heat withdrawing mechanism withdraws the ambient heat; and
- an auxiliary reflection plate that is disposed between the ultraviolet irradiation port of the housing and the ultraviolet lamp to adjust an illumination distribution, reflects light from the ultraviolet lamp and the reflection plate to the ultraviolet irradiation port to generate auxiliary reflection light to be applied to the target, and irradiates the target with uniform light by combining the light from the ultraviolet lamp and the reflection plate with the auxiliary reflection light; and wherein, the ultraviolet irradiation port is closed by a quartz glass window plate.

2. The ultraviolet irradiator according to claim 1, further comprising an air blower that circulates air in the housing to cool the reflection plate, wherein the air blower sucks air that flows along the reflection plate while withdrawing the heat of the reflection plate and blows the air to the heat transfer member.

3. The ultraviolet irradiator according to claim 2, wherein the ultraviolet lamp is configured in a tubular shape, the reflection plate and the heat transfer member are configured to extend along the ultraviolet lamp, and the air blower blows the air to the heat transfer member from a direction perpendicular to an extension direction of the heat transfer member.

4. The ultraviolet irradiator according to claim 1, wherein air circulating in the housing flows along the auxiliary reflection plate while cooling the auxiliary reflection plate, and is sucked by the air blower.

5. The ultraviolet irradiator according to claim 1, further comprising an ultraviolet transmission filter that is disposed between the ultraviolet irradiation port of the housing and the ultraviolet lamp and allows passage of only light of a predetermined ultraviolet region component out of the ultraviolet light emitted from the ultraviolet lamp and the reflection light reflected from the reflection plate, wherein the reflection plate absorbs light other than the light of the predetermined ultraviolet region component.

6. An ultraviolet irradiating apparatus comprising:

- a sample chamber in which a sample is mounted; and
- an ultraviolet irradiator that is freely incorporated in the ultraviolet irradiating apparatus to irradiate the target with ultraviolet light, wherein the ultraviolet irradiator comprises:
- a housing having an ultraviolet irradiation port through which the target is irradiated with the ultraviolet light;
- an ultraviolet lamp that emits ultraviolet light;
- a water-cooling jacket in which the ultraviolet lamp is mounted;
- a reflection plate that reflects light emitted from the ultraviolet lamp, the ultraviolet lamp, the water-cooling jacket and the reflection plate being mounted in the housing, and ultraviolet light emitted directly from the ultraviolet lamp and reflection light reflected from the reflection plate being irradiated to the outside of the housing;
- a heat withdrawing mechanism that withdraws heat of the reflection plate and discharges the heat to the outside of the housing;
- a heat transfer member that transfers ambient heat in the housing to the heat withdrawing mechanism so that the heat withdrawing mechanism withdraws the ambient heat; and
- an auxiliary reflection plate that is disposed between the ultraviolet irradiation port of the housing and the ultraviolet lamp to adjust an illumination distribution, reflects light from the ultraviolet lamp and the reflection plate to the ultraviolet irradiation port to generate auxiliary reflection light to be applied to the target, and irradiates the target with uniform light by combining the light from the ultraviolet lamp and the reflection plate with the auxiliary reflection light; and wherein, the ultraviolet irradiation port is closed by a quartz glass window plate.

7. The ultraviolet irradiating apparatus according to claim 6, further comprising an apparatus housing in which the sample chamber and the ultraviolet irradiator are mounted, wherein the housing has an opening and a door for opening and closing the opening, and the ultraviolet lamp is freely insertable and dismountable into and from the water-cooling jacket through the opening without dismounting the ultraviolet irradiator from the apparatus housing.

8. The ultraviolet irradiator according to claim 1, further comprising an auxiliary reflection plate mount case around which the auxiliary reflection is mounted, wherein the ultraviolet lamp, the water-cooling jacket, the reflection plate, the heat withdrawing mechanism and the heat transfer member are disposed at an upper portion of the housing, and the auxiliary reflection plate mount case is disposed between the ultraviolet lamp and the ultraviolet irradiation port at a lower portion of the housing.

9. The ultraviolet irradiating apparatus according to claim 6, wherein the ultraviolet irradiator further comprises an auxiliary reflection plate mount case around which the auxiliary reflection is mounted, the ultraviolet lamp, the water-cooling jacket, the reflection plate, the heat withdrawing mechanism and the heat transfer member are disposed at an upper portion of the housing, and the auxiliary reflection plate mount case is disposed between the ultraviolet lamp and the ultraviolet irradiation port at a lower portion of the housing.

* * * * *